| United States Patent [19] | [11] | 4,126,729 |
|---|---|---|
| Richardson et al. | [45] | Nov. 21, 1978 |

[54] GLASS FIBERS SIZED WITH VINYL ACETATE COPOLYMERS

[75] Inventors: Tom A. Richardson, Newark; William N. Haggerty, Reynoldsburg; Fred G. Krautz, Newark, all of Ohio

[73] Assignee: Owens-Corning Fiberglas Corporation, Toledo, Ohio

[21] Appl. No.: 793,971

[22] Filed: May 5, 1977

Related U.S. Application Data

[63] Continuation of Ser. No. 645,741, Dec. 31, 1975, abandoned.

[51] Int. Cl.$^2$ .......................... B32B 9/00; D02G 3/00
[52] U.S. Cl. ...................... 428/389; 260/29.6 RW; 260/29.6 WA; 428/375; 428/378; 428/391
[58] Field of Search ............... 428/391, 392, 375, 378, 428/389; 65/3 C; 260/29.6 RW, 29.6 WA, 897, 827; 526/273

[56] References Cited

U.S. PATENT DOCUMENTS

| 2,931,739 | 4/1960 | Marzocchi et al. | 428/391 |
| 3,418,094 | 12/1968 | Marsden et al. | 65/3 |
| 3,534,004 | 10/1970 | Luvisi | 260/85.7 X |
| 3,655,353 | 4/1972 | Nalley et al. | 428/391 X |
| 3,705,125 | 12/1972 | Preston et al. | 428/391 X |
| 3,772,870 | 11/1973 | Wong et al. | 428/392 |
| 3,827,230 | 8/1974 | Marzocchi | 428/392 X |
| 3,935,344 | 1/1976 | Haggerty et al. | 428/378 |

*Primary Examiner*—Lorraine T. Kendell
*Attorney, Agent, or Firm*—Ronald C. Hudgens; Philip R. Cloutier; Dennis M. Kozak

[57] ABSTRACT

Disclosed are gun roving glass fibers coated with an aqueous-based size comprising an epoxidized polyvinyl acetate copolymer in combination with a vinyl acetate-ethylene copolymer and a vinyl acetate copolymer.

11 Claims, No Drawings

GLASS FIBERS SIZED WITH VINYL ACETATE COPOLYMERS

This is a continuation of application Ser. No. 645,741 filed Dec. 31, 1975, and now abandoned.

This invention relates to an aqueous-based sizing for siliceous substrates.

In one of its more specific aspects, this invention relates to an aqueous-based sizing applied to glass fibers employed for resin reinforcement.

The sizing of glass fibers for the purpose of providing a protective coating is well known. Frequently, such sizes are applied in the form of aqueous solutions as the fibers are drawn. Such sizings can be applied to all forms of glass fibers. When applied to fibers such as those which are employed for resin reinforcement, it is desirable that the size also act to facilitate the adhesion between the resin and the fibers which reinforce it. This is particularly true where the fibers are subsequently formed into gun roving products which are chopped prior to incorporation in the resin.

The sizing of the present invention is particularly suitable for reinforcing gun roving reinforced products inasmuch as the sized roving chops well, exhibits low static and possesses superior wet-out sprayed with the resins.

According to this invention, there is provided at least one glass fiber, at least a portion of the surface of which is coated with an effective amount of a substance derived from an aqueous composition comprising an epoxidized polyvinyl acetate copolymer emulsion.

Also, according to this invention, there is provided a composition comprising a resin and at least one glass fiber at least a portion of the surface of which is coated with a substance derived from an aqueous composition comprising an epoxidized polyvinyl acetate copolymer.

In one embodiment of this invention, the size composition consists essentially of an epoxidized polyvinyl acetate copolymer, a vinyl acetate-ethylene copolymer and a vinyl acetate copolymer, these materials being present in the size composition in the form of their emulsions.

In its preferred form, the aqueous composition will also comprise a coupling agent, a lubricant, a methacrylate chromic chloride and a polyethylenimine condensate.

As used herein, the term "glass fibers" is intended to refer to and include continuous fibers formed by the attenuation of a stream, or streams, of molten glass and to strands formed when such continuous glass fiber filaments are gathered together in forming.

The aqueous size composition will contain from about 1.5 to about 3 weight percent of the epoxidized polyvinyl acetate copolymer in the form of an emulsion. This copolymer is a copolymer of glycidyl methacrylate and vinyl acetate, the copolymer contain about 2 parts of glycidyl methacrylate per 100 parts of vinyl acetate. In its preferred form, the copolymer will be employed in the form of a 53 percent solids emulsion, the copolymer having a particle size within the range of from about 0.2 to 0.3 microns.

A suitable epoxidized polyvinyl acetate copolymer is available from National Starch, Bridgewater, N.J. as "25-1971".

The aqueous size composition will contain from about 1.8 to about 3.6 weight percent of an ethylene-vinyl acetate copolymer in the form of a 55% solids emulsion. This material will be employed in a form comprising from about 5 to about 40% ethylene content, with about 15% ethylene content being preferred.

One suitable material is that ethylene-vinyl acetate copolymer disclosed in U.S. Pat. No. 3,716,504.

The aqueous size composition can contain from about 3.7 to about 7.4 weight percent of a vinyl acetate copolymer in the form of 55% solids emulsion. This material is a copolymer of vinyl acetate and ethyl acrylate, these monomers being present in a ratio of about 15 parts by weight of the ethyl acrylate to about 100 parts by weight of the vinyl acetate. The emulsion form in which this copolymer is employed contains about 55 weight percent solids, has an average particle size of about 0.9 microns, and a viscosity of about 850 cps (Brookfield, LVF, #3 Spindle, 60 RPM at 72° F). One particularly suitable copolymer emulsion is "Resyn 2211" available from National Starch and Chemical Corporation, Bridgewater, N.J.

The aqueous size composition can contain from about 0.05 to about 0.50 weight percent of a silane coupling agent. Any suitable silane coupling agent, such as g-methacryloxypropyltrimethoxysilane, can be employed. A particularly suitable silane coupling agent is available from Union Carbide, N.Y., N.Y. as "A-174".

The aqueous size composition can contain from about 0.5 to about 5.0 weight percent of a Werner-type chromium complex. Any suitable complex, such as methacrylate chromic chloride can be employed. A particularly suitable complex is available from duPont, Wilmington, N.J. as "Volan".

The aqueous size composition can contain from about 0.03 to about 0.10 weight percent of a polyethylenimine condensate.

One suitable polyethylenimine condensate is a partial amide having the general formula:

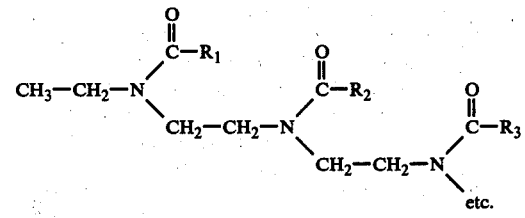

in which formula $R_1$, $R_2$, $R_3$, etc. represent a mixture of fatty acid chain lengths having 6 to 8 carbon atoms. The material has an amine value of between about 340–410.

One suitable material is commercially available as "Emery 6717" from Trylon Chemicals, Inc., Mauldin, S.C.

The aqueous size composition can contain from about 0.01 to about 0.03 acetic acid and from about 0.10 to about 0.50 of a lubricant, the latter preferably being an amide-ester lubricant, one suitable material being "Emerlube 7440" available from Emery Industries, Cincinnati, Ohio.

In one embodiment of the invention, the aqueous size composition will consist essentially of about 1.9 weight percent epoxidized polyvinyl acetate copolymer, about 2.3 weight percent vinyl acetate-ethylene copolymer and about 4.7 weight percent of vinyl acetate copolymer, the balance of the composition being distilled water.

In the preferred embodiment of the invention, in addition to the above, the silane is included in an amount of about 0.1 weight percent, the chromic chloride complex in an amount of about 1.5 weight percent, the polyethylenimine in an amount of about 0.04 weight percent, the acetic acid in an amount of about 0.02 weight percent, and the lubricant in an amount of about 0.15 weight percent.

The following example demonstrates one method of preparing the size of this invention.

EXAMPLE I

This mixing procedure is based upon the preparation of 100 gallons of the size composition. All water is deionized.

Into a main mix tank, introduce 40 gal. of water.

Into a first tank introduce 5 gal. of water and add 0.03 pounds of acetic acid thereto.

Introduce 0.84 pounds of the silane into the aqueous acetic acid mixture. Introduce the resulting mixture into the main mix tank.

Introduce 10 gals. of water into a second mix tank and add 39 pounds of the vinyl acetate copolymer emulsion. After 5 minutes agitation introduce 39 pounds of epoxidized vinyl acetate copolymer. After five minutes agitation, add 19.4 pounds of ethylene-vinyl acetate copolymer. After 5 minutes continuous agitation add 16 pounds of epoxidized polyvinyl acetate copolymer. Continue agitation for 5 minutes and add to the contents of the main mix tank.

Introduce 2 gal. of water into a mix tank and add 0.15 pounds of acetic acid thereto. Add the resulting acidic solution to 0.3 pounds of the polyethylenimine condensate. Introduce resulting solution into the main mix tank.

Introduce 5 gal. of water into a premix tank and, slowly add 12.5 pounds of the chromic chloride complex. After 10 minutes agitation, introduce the resulting mixture into the main mix tank.

Into a premix tank, introduce 2 gal. of water. Introduce about 1.25 pounds of the lubricant. Introduce the resulting solution into the main mix tank.

The preparation of the size composition is completed by introducing sufficient water into the main mix tank to bring the total volume of the solution to 100 gallons.

The size composition will have a pH within the range of from about 3.9 to about 4.4 with the preferred pH being about 4.15. The size will contain about 5.7 percent solids, maximum.

The size composition can be applied to the fibers in any suitable manner, for example, by the use of a graphite roll. The size fibers are dried under usual drying conditions.

The following table presents physical property data on sized fibers and on heat cleaned fibers.

| | Fibers | |
|---|---|---|
| | Sized | Heat Cleaned |
| Flexural Strength, psi $\times 10^3$ | | |
| Dry | 173.5 | 175.0 |
| Wet | 135.3 | 36.0 |
| % Retention | 78 | 21 |

The above data indicate that the fibers sized with the composition of this invention possess in the dry condition, both sized and heat cleaned substantially the same strength properties.

The glass fibers sized with the composition of this invention can be gathered into strands, and the strands roved and make gun roving.

It will be evident from the foregoing that various modifications can be made to this invention. Such, however, are considered within the scope of the invention.

What is claimed is:

1. Glass fibers coated with an effective amount of a substance derived from an aqueous composition comprising an epoxidized polyvinyl acetate copolymer, an ethylene vinyl acetate copolymer, and a vinyl acetate ethyl acrylate copolymer.

2. The glass fibers of claim 1 in which said epoxidized polyvinyl acetate copolymer is present in said aqueous composition in an amount within the range of from about 1.5 to about 3 weight percent.

3. The glass fibers of claim 1 in which said ethylene vinyl acetate copolymer is present in an amount within the range of from about 1.8 to about 3.6 weight percent.

4. The glass fibers of claim 1 in which said vinyl acetate ethyl acrylate copolymer is present in an amount within the range of from about 3.7 to about 7.4 weight percent.

5. The glass fibers of claim 1 in which said aqueous composition comprises a silane coupling agent, a methacrylate chromic chloride and a polyethyleneimine condensate.

6. The glass fibers of claim 1 in which said aqueous composition comprises a silane coupling agent, a methacrylate chromic chloride, a polyethyleneimine condensate and a lubricant.

7. Glass fibers coated with the dried residue of an aqueous mixture consisting essentially of an epoxidized polyvinyl acetate copolymer, an ethylene vinyl acetate copolymer, a vinyl acetate ethyl acrylate copolymer, a silane coupling agent, a methacrylate chromic chloride and a polyethyleneimine condensate.

8. Glass fibers coated with the dried residue of an aqueous mixture consisting essentially of an epoxidized polyvinyl acetate copolymer, an ethylene vinyl acetate copolymer, a vinyl acetate ethyl acrylate copolymer, a silane glass coupling agent, a Werner-type chromium complex and a polyethyleneimine condensate.

9. Glass fibers coated with the dried residue of an aqueous mixture consisting essentially of from about 1.5 to about 3% of an epoxidized polyvinyl acetate copolymer; from about 1.8 to about 3.6% of an ethylene vinyl acetate copolymer; from about 3.7 to about 7.4% of a vinyl acetate ethyl acrylate copolymer; from about 0.05 to about 0.50% of a silane glass coupling agent; from about 0.5 to about 5.0% of a Werner-type chromium complex; and from about 0.03 to about 0.10% of a polyethyleneimine; said percentages being by weight of the aqueous mixture.

10. The glass fibers of claim 9 wherein the epoxidized polyvinyl acetate copolymer is a copolymer of vinyl acetate and a minor amount of glycidyl methacrylate.

11. The glass fibers of claim 9 wherein the glycidyl methacrylate comprises approximately 2% of the copolymer.

* * * * *